United States Patent
Liu et al.

(10) Patent No.: US 9,990,235 B2
(45) Date of Patent: Jun. 5, 2018

(54) DETERMINING TASKS TO BE PERFORMED BY A MODULAR ENTITY

(71) Applicant: Google Inc., Mountain View, CA (US)

(72) Inventors: Eric H C Liu, Redwood City, CA (US); Kevin D. Brune, Maple Valley, WA (US); Yoshimichi Matsuoka, Sunnyvale, CA (US); Gilbert Cabillic, Brece (FR); Gaurav Shah, San Jose, CA (US)

(73) Assignee: Google LLC, Mountain View, CA (US)

( * ) Notice: Subject to any disclaimer, the term of this patent is extended or adjusted under 35 U.S.C. 154(b) by 99 days.

(21) Appl. No.: 15/130,436

(22) Filed: Apr. 15, 2016

(65) Prior Publication Data

US 2017/0300366 A1  Oct. 19, 2017

(51) Int. Cl.
G06F 9/46 (2006.01)
G06F 9/50 (2006.01)
G06F 17/30 (2006.01)

(52) U.S. Cl.
CPC ........ G06F 9/5055 (2013.01); G06F 17/3053 (2013.01); G06F 17/30598 (2013.01)

(58) Field of Classification Search
None
See application file for complete search history.

(56) References Cited

U.S. PATENT DOCUMENTS

| | | | |
|---|---|---|---|
| 6,069,911 A | 5/2000 | Sealander et al. | |
| 6,282,561 B1 | 8/2001 | Jones et al. | |
| 6,771,595 B1 | 8/2004 | Gilbert et al. | |
| 6,785,889 B1 | 8/2004 | Williams | |
| 6,941,399 B2 | 9/2005 | Loh | |
| 6,961,575 B2 | 11/2005 | Stanforth | |
| 6,968,323 B1 | 11/2005 | Bansal et al. | |
| 6,975,613 B1 | 12/2005 | Johansson | |
| 7,009,939 B2 | 3/2006 | Baker et al. | |
| 7,043,225 B1 | 5/2006 | Patel et al. | |
| 7,058,387 B2 | 6/2006 | Kumar et al. | |
| 7,184,759 B2 | 2/2007 | Date et al. | |
| 7,257,632 B2 | 8/2007 | Zhang et al. | |
| 7,340,759 B1 | 3/2008 | Rodriguez | |

(Continued)

FOREIGN PATENT DOCUMENTS

EP    2749200    7/2014

OTHER PUBLICATIONS

International Search Report for PCT/US2016/06268, dated May 15, 2017, 18 pages.

Primary Examiner — Gregory A Kessler
(74) Attorney, Agent, or Firm — Dority & Manning, P.A.

(57) ABSTRACT

Systems and methods of determining tasks to be performed by a modular entity are disclosed. For instance, data associated with one or more tasks performed by one or more first modular entities within one or more modular computing environments can be obtained. Each first modular entity includes at least one modular component. A performance score can be determined for each task performed by each first modular entity. The performance scores can provide a measure of efficiency of a performance of a task by a first modular entity. An entity profile can be determined for each first modular entity based at least in part on the determined performance scores. At least one task to be performed by at least one modular entity can be determined based at least in part on the determined entity profiles for the one or more first modular entities.

15 Claims, 3 Drawing Sheets

(56) References Cited

U.S. PATENT DOCUMENTS

| | | |
|---|---|---|
| 7,346,354 B2 | 3/2008 | Patel |
| 7,463,890 B2 | 12/2008 | Herz et al. |
| 7,489,656 B2 | 2/2009 | Guo et al. |
| 7,689,681 B1 | 3/2010 | David |
| 7,720,968 B2 | 5/2010 | Clark, Jr. et al. |
| 7,788,133 B2 | 8/2010 | Delenda |
| 8,027,684 B2 | 9/2011 | Gupta et al. |
| 8,028,057 B2 | 9/2011 | David |
| 8,156,500 B2 | 4/2012 | Helander |
| 8,185,909 B2 | 5/2012 | Sigal et al. |
| 8,249,984 B2 | 8/2012 | Dawson et al. |
| 8,276,143 B2 | 9/2012 | Vengerov et al. |
| 8,296,770 B2 | 10/2012 | Ohno |
| 8,320,414 B2 | 11/2012 | Dawson et al. |
| 8,355,670 B2 | 1/2013 | White |
| 8,424,007 B1 | 4/2013 | Hernacki et al. |
| 8,520,535 B2 | 8/2013 | Dawson et al. |
| 8,667,065 B1 | 3/2014 | Odom |
| 8,694,968 B2 | 4/2014 | Eteminan et al. |
| 8,730,994 B2 | 5/2014 | Kannan et al. |
| 8,782,211 B1 | 7/2014 | Sharma |
| 9,003,039 B2 | 4/2015 | Amorim |
| 9,015,708 B2 | 4/2015 | Choudhury et al. |
| 9,031,531 B2 | 5/2015 | Miluzzo et al. |
| 9,037,508 B2 | 5/2015 | Dawson et al. |
| 9,038,195 B2 | 5/2015 | Satpathy et al. |
| 9,075,659 B2 | 7/2015 | Barzel et al. |
| 9,078,274 B2 | 7/2015 | Guo |
| 9,083,819 B2 | 7/2015 | Chan et al. |
| 9,118,750 B2 | 8/2015 | Vossoughi et al. |
| 9,148,473 B1 | 9/2015 | Sharma |
| 9,229,781 B2 | 1/2016 | Karaoguz et al. |
| 9,241,304 B2 | 1/2016 | Dawson et al. |
| 2002/0058499 A1 | 5/2002 | Ortiz |
| 2003/0139199 A1 | 7/2003 | Kinnula et al. |
| 2003/0217129 A1 | 11/2003 | Knittel et al. |
| 2004/0111308 A1 | 6/2004 | Yakov |
| 2004/0128262 A1 | 7/2004 | Nafousi |
| 2004/0156312 A1 | 8/2004 | Salonidis et al. |
| 2004/0165548 A1 | 8/2004 | Backes |
| 2004/0203820 A1 | 10/2004 | Billhartz |
| 2006/0007955 A1 | 1/2006 | Kotzin |
| 2006/0167784 A1 | 7/2006 | Hoffberg |
| 2007/0230421 A1 | 10/2007 | Roadknight |
| 2007/0294692 A1 | 12/2007 | Zhao et al. |
| 2008/0040481 A1 | 2/2008 | Joshi et al. |
| 2008/0298284 A1 | 12/2008 | Dawson et al. |
| 2008/0298314 A1 | 12/2008 | Dawson et al. |
| 2008/0300890 A1 | 12/2008 | Dawson et al. |
| 2008/0301017 A1 | 12/2008 | Dawson et al. |
| 2008/0313642 A1 | 12/2008 | Karaoguz et al. |
| 2009/0025004 A1 | 1/2009 | Barnard et al. |
| 2009/0180430 A1 | 7/2009 | Fadell |
| 2009/0228888 A1 | 9/2009 | Vengerov et al. |
| 2009/0271324 A1 | 10/2009 | Jandhyala et al. |
| 2010/0223385 A1 | 9/2010 | Gulley et al. |
| 2010/0251259 A1 | 9/2010 | Howard |
| 2010/0332262 A1 | 12/2010 | Horvitz et al. |
| 2011/0288905 A1 | 11/2011 | Mrakas |
| 2011/0320233 A1 | 12/2011 | Arnette et al. |
| 2012/0079097 A1 | 3/2012 | Gopisetty et al. |
| 2012/0324111 A1 | 12/2012 | Barzel et al. |
| 2013/0042004 A1 | 2/2013 | Boss et al. |
| 2014/0067496 A1 | 3/2014 | Buswell |
| 2014/0082165 A1 | 3/2014 | Marr et al. |
| 2014/0195683 A1 | 7/2014 | Ammerman, III et al. |
| 2014/0307635 A1 | 10/2014 | Agrawal et al. |
| 2015/0026336 A1 | 1/2015 | Suchter et al. |
| 2015/0067022 A1 | 3/2015 | Subbiah |
| 2015/0074635 A1 | 3/2015 | Margiotta et al. |
| 2015/0195011 A1 | 7/2015 | Birgel et al. |
| 2015/0206228 A1 | 7/2015 | Perez et al. |

DETERMINING TASKS TO BE PERFORMED BY A MODULAR ENTITY

FIELD

The present disclosure relates generally to modular computing systems, and more particularly to determining tasks to be performed by a modular entity

BACKGROUND

Modular systems such as a modular computing system can have multiple different modular electronic components. Modular components can be removable, replaceable, and/or interchangeable. In general, different modular components of a modular device or system can be capable of performing different functions, including a specialized function and/or one or more general functions.

As an example, specialized modular components can perform one or more specific functions using one or more specific resources. Examples of specialized modular components can include a camera modular component, a battery modular component, or other modular component configured to perform a particular task. Thus, in some examples, the specific functions can include capturing an image, supplying power, or performing a specific function using special hardware (e.g., performing a cryptographic function, a graphics processing function, etc.).

Other modular components can have the capability to perform general functions using their general resources, such as a memory and a processor. For example, modular components can have the ability to communicate with an external modular component or device (e.g., through a hardwired connection or using a wireless connection). Examples of general functions include performing a processing task, storing data in memory, or utilizing communication bandwidth.

Modular components can be combined with other modular components or devices. In some examples, such combination can utilize physical combination, for example, by attaching modular components to each other or a common structure. For example, a processing modular component from a modular phone can be removably physically combined with an interface modular component (e.g., HDMI or USB) to provide video-playback functionality. In other examples, combinations of modular components can include physically unconnected devices, such as, for example, modular components that are communicatively connected over one or more wireless communication links.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining tasks to be performed by a modular entity. The method includes obtaining, by one or more computing devices, data associated with one or more tasks performed by one or more first modular entities within one or more modular computing environments. Each first modular entity includes at least one modular component. The method further includes determining, by the one or more computing devices, a performance score for each task performed by each first modular entity. Each performance score provides a measure of efficiency of a performance of a task by a first modular entity. The method further includes determining, by the one or more computing devices, an entity profile for each first modular entity based at least in part on the determined performance scores. The method further includes determining, by the one or more computing devices, at least one task to be performed by at least one modular entity based at least in part on the determined entity profiles for the one or more first modular entities.

Other example aspects of the present disclosure are directed to systems, apparatus, tangible, non-transitory computer-readable media, user interfaces, memory devices, and electronic devices for determining tasks to be performed by a modular entity.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to determining tasks to be performed by computing entities within a modular computing environment. For instance, data associated with tasks performed by a plurality of modular entities (e.g. modular computing devices, combinations of modular computing devices, modular components, etc.) can be obtained. A performance score for each performed task can be determined and associated with the modular entity that performed the task. The performance scores can provide a measure of efficiency of a performance of a task by a modular entity. Entity profiles can be determined for each modular entity based at least in part on the performance scores. The entity profiles and/or performance scores can then be used to determine tasks to be performed by the corresponding modular entities and/or additional modular entities.

More particularly, a modular entity can be a modular component or a combination of modular components within a modular computing environment. For instance, a modular entity can be a modular computing device made up of one or more modular components. As another example, a modular entity can be a modular component within a modular computing device. In some implementations, a modular entity can be a combination of modular components connected via an ad hoc network. A modular entity can be configured to perform one or more tasks or subtasks. Modular components and/or modular computing devices within a modular entity can share functionality and/or resources to complete such tasks or subtasks. In this manner, tasks and/or subtasks can be allocated to one or more components within a modular entity based at least in part on the functionalities and/or available resources of the components.

Some modular entities may be well suited to perform particular tasks. More particularly, the functionalities and/or available resources of a modular entity can dictate the efficiency at which a modular entity can perform a particular task. In this manner, a performance score can be determined for each performed task to reflect the efficiency with which the task was performed. The performance scores can then be associated with the modular entity that performed the task. In some implementations, the performance scores can be determined based at least in part on a speed with which the task was performed, an amount of resources used to perform the task, an amount of errors produced by performing the task and/or various other suitable metrics or parameters. In implementations wherein the modular entity includes a combination of modular components, a performance score can be determined for each task or subtask performed by each modular component. In this manner, the performance scores can be determined to identify modular components, modular computing devices, etc. that are well suited to perform particular tasks.

The performance scores can be used to determine an entity profile for the modular entities. For instance, entity profiles can be determined for one or more modular components, modular computing devices, combinations of modular computing devices, ad hoc network configurations, etc. (e.g. modular entities). An entity profile can provide an indication of one or more tasks that a modular entity is well suited to perform. For instance, an entity profile may include a list of tasks that the modular entity is well suited to perform. In some implementations, the determination of an entity profile can include comparing the performance scores determined for the modular entity to a performance threshold. The performance threshold can be indicative of an acceptable performance score for determining whether a modular entity is well suited for performing a particular task. In this manner, if the performance score achieved by the modular entity in performing the task is greater than the threshold, the task may be added to the list of tasks stored in the entity profile. For instance, in some implementations, if the performance score is greater than the threshold, the modular entity may be designated as a "specialist" for the task.

In some implementations, one or more machine learning and/or pattern recognition techniques can be used to determine tasks that are well suited for one or more modular entities. For instance, one or more supervised or unsupervised learning algorithms can be used to determine patterns in task performance by different modular entities, and to determine tasks that such modular entities are well suited to perform to achieve a desired output. In some implementations, tasks or capabilities of various modular components within a modular entity can be combined in various manners to achieve a desired result. For instance, such tasks or capabilities may be combined in a serial manner and/or in a parallel manner to achieve a desired result. In some implementations, various manners in which resources are allocated within a modular entity can be analyzed to determine suitable tasks for the modular entity. Such learned information can be included in the entity profile associated with the modular component.

As indicated, one or more entity profiles can be used to determine future tasks to be performed by a modular entity. For instance, the entity profile for a modular entity can be accessed to determine a task to perform and/or a resource allocation in the performance of the task by the modular entity. In particular, one or more tasks can be chosen from the list of tasks associated with the entity profile. In some implementations, one or more comparable entity profiles of a modular entity can be accessed to determine a task to perform and/or a resource allocation. A comparable entity profile can be an entity profile that corresponds to a modular entity that is similar to the current modular entity. In particular, similar modular entities can be modular entities that share at least one modular component type. In this manner, the comparable entity profiles can be used to determine a task to be performed by the modular entity.

The entity profiles may further be used to determine an allocation of resources of a modular entity in performing a task. For instance, one or more subtasks may be allocated to one or more computing devices and/or components within a modular entity to complete the task. Such resource allocation may be determined based at least in part on the availability of the resources within the modular entity. In this manner, the allocation of resource may be determined to provide an efficient use of resources in performing the task.

In some implementations, one or more entity profiles can be identified to determine one or more additional modular components to add to a modular entity to perform a desired task. For instance, one or more entity profiles corresponding to modular entities designated a "specialist" for a task can be accessed and compared to a current modular entity that desires to perform the same, or similar, task. Based at least in part on the comparison, it may be determined that a modular entity would be better suited to perform a particular task if an additional or different component was included within the modular entity. In some implementations, if such additional or different component is available, it can be added to the modular entity, for instance, via communication over a network.

Figure 1:
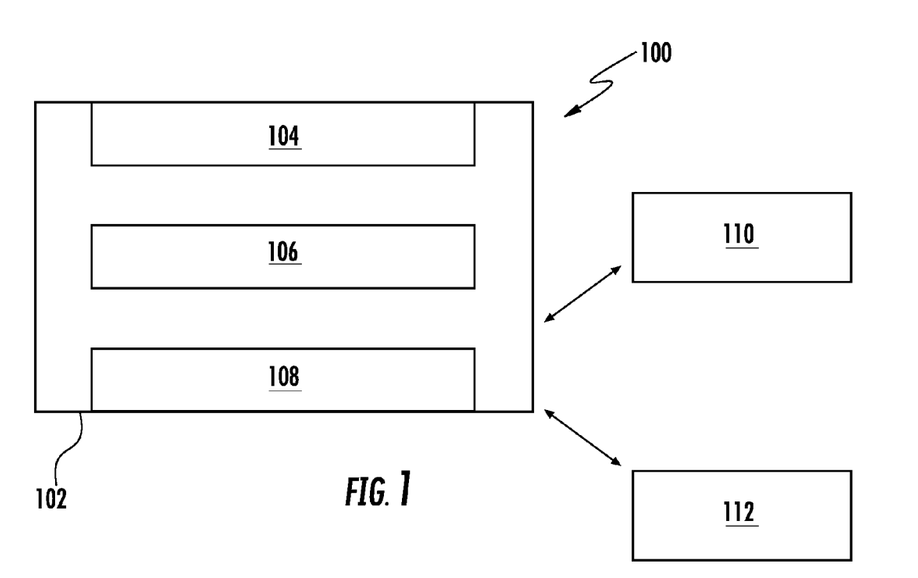
FIG. 1 depicts an example modular entity according to example embodiments of the present disclosure.

With reference now to the figures, example aspects of the present disclosure will be discussed in greater detail. For instance, FIG. 1 depicts an example modular entity 100 according to example embodiments of the present disclosure. Modular entity 100 includes a modular computing device 102 having associated modular components 104, 106, and 108. Modular components 104-108 can join or interface with modular entity 100 through a physical connection with modular computing device 102 and/or through a wireless connection with modular computing device 102, such as through direct wireless communication. Modular entity 100 further includes network devices 110, 112 connected to modular computing device 102, for instance, via a wireless ad hoc network. In some implementations, modular computing device 102, modular components 104-108, and/or network devices 110, 112 can advertise their respective availability and/or capabilities, and can communicate among each other to create and/or join the ad hoc network. For instance, the ad hoc network can be created based at least on a desired task to be performed by the modular entity. Members can be added to the ad hoc network based at least in part on one or more available resources and/or capabilities of the members in view of the desired task.

For instance, each component or device can have one or more capabilities or functions that can be implemented by the modular entity. For instance, a component or device can have a display screen function, an image capture function, a power function, and/or various other suitable capabilities or functions. In some implementations, a component or device may have capabilities or functions that can contribute to capabilities of other components or devices within the modular computing environment. For instance, a modular component can include memory to be added to a total device memory, processing capability to be added to a total device processing capability, battery storage to be added to a total device battery storage, etc.

It will be appreciated that example modular entity 100 is depicted for illustrative purposes only. In this regard, it will be further appreciated that modular entity 100 can include various other suitable configurations without deviating from the scope of the preset disclosure. In particular, a modular entity can include any suitable number of devices or components that communicate using various suitable communication techniques (e.g. physical connection, near field communication, ad hoc network, etc.). In some implementations, a modular entity can include a single modular component.

Figure 2:
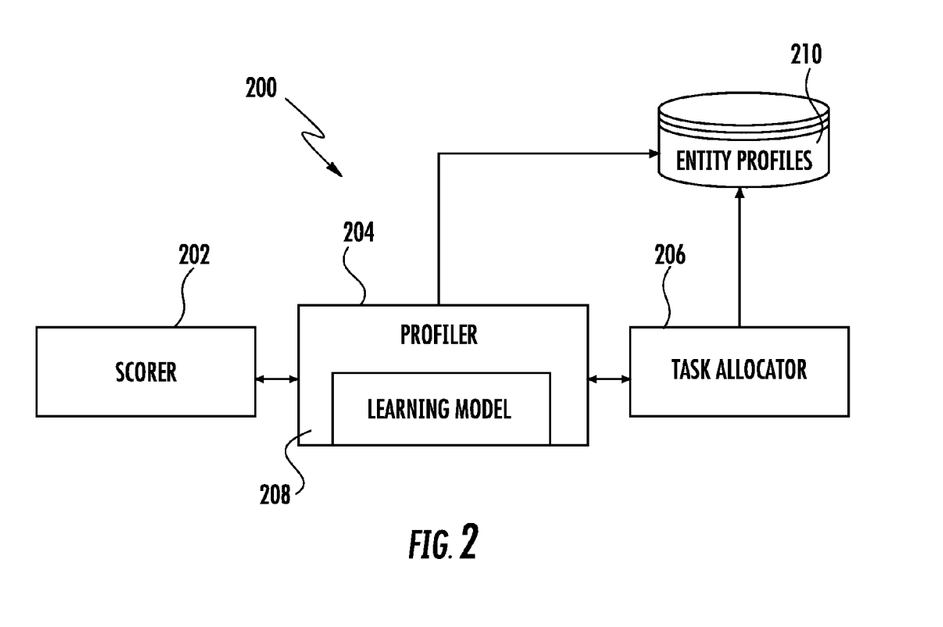
FIG. 2 depicts an overview of an example system for determining tasks to be performed by a modular entity according to example embodiments of the present disclosure.

FIG. 2 depicts an example system 200 of determining tasks to be performed by a modular entity according to example embodiments of the preset disclosure. System 200 includes a scorer 202, a profiler 204, and a task allocator 206. System 100 can be implemented in one or more computing devices. For instance, in various implementations, system 100 can be implemented in a central server communicatively coupled to a plurality of modular entities, in the modular entities themselves, and/or within individual components or devices that contribute to a modular entity. In some implementations, one or more aspects of system 100 can be included in various locations. For instance, scorer 202 may be implemented within the central server, while profiler 204 and task allocator 206 can be implemented by a modular entity. It will further be appreciated that system 100 is depicted for illustrative purposes only, and that various other suitable systems having various other suitable configurations can be used without deviating from the scope of the present disclosure. For instance one or more components of system 100 may be combined, or one or more additional components may be added without deviating from the scope of the present disclosure.

Scorer 202 can be configured to determine performance scores for performed tasks. In particular, scorer 202 can be configured to obtain data associated with one or more tasks performed by a plurality of modular entities. The tasks can be global tasks to be achieved by an entire modular entity and/or subtasks to be achieved by a subset of devices or components within a modular entity. For instance, a subtask can be performed by one or more components or devices within a modular entity in service of achieving a global task.

Scorer 202 can be configured to determine a performance score for each performed task. As indicated the performance score can be indicative of an efficiency with which the task was performed. In some implementations, the performance score can be determined based at least in part on a speed with which the task was performed, an amount of resources used in performing the task, an amount of errors produced in performing the task and/or various other suitable metrics.

Scorer 202 can further receive data indicative of the modular entities that perform the tasks. For instance, the data indicative of the modular entities can include the components or devices included in the entity, the communication techniques used by the various components or devices within entity (e.g. ad hoc network, physical connection, etc.) The determined performance scores can then be associated with the modular entities that performed the tasks. In some implementations, the performance scored can further be associated with the components or devices that performed the task. For instance, if a task is performed by a subset of devices of the modular entity, the performance score determined for the task can be associated with the modular entity and/or the subset.

The associated performance scores can be provided to profiler 204. Profiler 204 can be determined to create and maintain entity profiles associated with a plurality of modular entities. An entity profile can include data indicative of a modular entity, as well as data associated with various tasks performed by the modular entity. In some implementations, the entity profile can include the performance scores for the tasks performed by the modular entity.

Profiler 204 can be configured to determine tasks that a modular entity is well suited to perform. For instance, profiler 204 may be configured to classify a modular entity as a specialist for a particular task. In implementations wherein a modular entity includes multiple components or devices, profiler 204 may be further configured to classify one or more components or devices within a modular entity as a specialist for a particular task.

In some implementations, profiler 204 can determine tasks that a modular entity is well suited to perform based at least in part on the performance scores associated with the entity. For instance, profiler 204 can compare the performance score for a task to a performance threshold. A performance score that is greater than the performance threshold can indicate that the modular entity has a high capacity for performing the task. For instance, a modular entity can be classified or otherwise designated as a specialist for a task if the associated performance score for the task is greater than the performance threshold.

An entity profile for a modular entity can include a listing of obtained tasks performed by the modular entity, a number of times that tasks have been performed by the modular entity, and associated performance scores for the tasks. In some implementations, the entity profile can further include an indication of tasks for which the modular entity is a specialist. In some implementations, an entity profile can store a listing of only those tasks that the modular entity has been determined to be well suited to perform. In some implementations, a separate entity profile can be created for each component or device within a modular entity. In this manner, for modular entities that include multiple components or devices, separate entity profiles can be created for each component or device specifying a list of obtained tasks performed by the component or device, and associated performance scores for the tasks.

As indicated, profiler 204 may use one or more machine learning techniques to determine tasks that a modular entity is well suited for. In particular, profiler 204 may include learning model 208. Learning model 208 can be any suitable machine learning model or network, such a neural network, a convolutional neural network, Naive Bayes, nearest neighbor model, support vector machine, and/or various other suitable model. In some implementations, learning model 208 can be trained (e.g. using supervised or unsupervised learning techniques) to predict tasks that a modular entity is well suited to perform. In this manner, learning model 208 can receive as input data indicative of a modular entity, and produce an output specifying one or more tasks. In some implementations, learning model 208 can provide an output indicative of a predicted performance score for modular entity in performing a task. In some implementations, learning model 208 can recognize patterns in task performance by different modular entities, and determine that such combinations can be used to perform one or more functions or tasks to achieve a desired output. Learning model 208 outputs associated with a modular entity can be included in the corresponding entity profile associated with the modular entity, and further used in allocating or suggesting one or more tasks to be performed by modular entities.

For instance, task allocator 206 can be configured to receive modular entity data 210. Modular entity data 210 can be associated with a request for task allocation, task recommendation, and/or task scheduling associated with a modular entity. In some implementations, the request can be made based at least in part on a user interaction with a user interface associated with the requesting modular entity. Modular entity data 210 can include data indicative of the requesting modular entity, such as an identifier associated with the modular entity, a listing of components or devices that contribute to the modular entity, one or more tasks to be performed by the modular entity, available resources of the modular entity, capabilities of the modular entity, and/or various other suitable data associated with the requesting modular entity.

For instance, in some implementations, the requesting modular entity can request a list of tasks that the modular entity is well suited to perform. In some implementations, the requesting modular entity can request an allocation of subtasks or tasklets to be performed by the components or devices that contribute to the modular entity to achieve a global task. In some implementations, the requesting modular entity can request one or more suggested tasks to perform. In some implementations, the requesting modular entity can request a recommendation on whether the modular entity is well suited to perform a particular task. It will be appreciated that various other suitable requests can be made.

Task allocator 208 can fulfill the requests based at least in part on entity profiles 212 determined by profiler 204. For instance, in some implementations, task allocator 208 can obtain an entity profile determined for the requesting modular entity to fulfill the request. If the requesting modular entity does not have a corresponding entity profile, task allocator 208 can obtain one or more comparable entity profiles. A comparable entity profile can be an entity profile corresponding to a modular entity having one or more shared components or devices, and/or component or device types with the requesting modular entity.

In this manner, task allocator 208 can determine one or more tasks to be performed by a requesting modular entity based at least in part on the obtained entity profile and the data indicative of the requesting modular entity (e.g. capabilities, available resources, etc.). For instance, task allocator 208 can determine one or more tasks that the requesting modular entity is well suited to perform based at least in part on the performance scores included in the entity profile. In some implementations, task allocator 208 can determine a schedule or allocation of tasks to be performed by the requesting modular entity. For instance, task allocator 208 can suggest or determine that two or more tasks or subtasks be performed in a serial or parallel manner. Task allocator 208 may further determine suggested ad hoc combinations of modular components or devices that can be used to perform a desired task. For instance, task allocator can identify one or more additional components or devices to be added to the requesting modular entity to achieve the desired task. The requesting modular entity may then seek out such additional components or devices, and may add the additional components or devices as desired.

In some implementations, system 200 may offer one or more services to the requesting modular entity to achieve the desired task. For instance, in implementations wherein at least a portion of system 200 is located at a central server device, the server may offer one or more available resources to the requesting modular entity.

As indicated, at least a portion of system 200 can be implemented by a central server, a modular entity, and/or a component or device within the modular entity. In implementations, wherein system 200 is implemented by a modular entity, the modular entity may be configured to recognize that certain modular components or devices within the modular entity are better suited to perform particular tasks or subtasks, and to allocate such tasks or subtasks accordingly. In implementations, wherein system 200 in implemented by an individual component or device, the component or device may recognize or learn which tasks that the component or device is well suited to perform. In implementations, wherein system 200 is implemented by the central server, a modular entity or device can communicate with the server to determine suitable tasks to perform.

Figure 3:
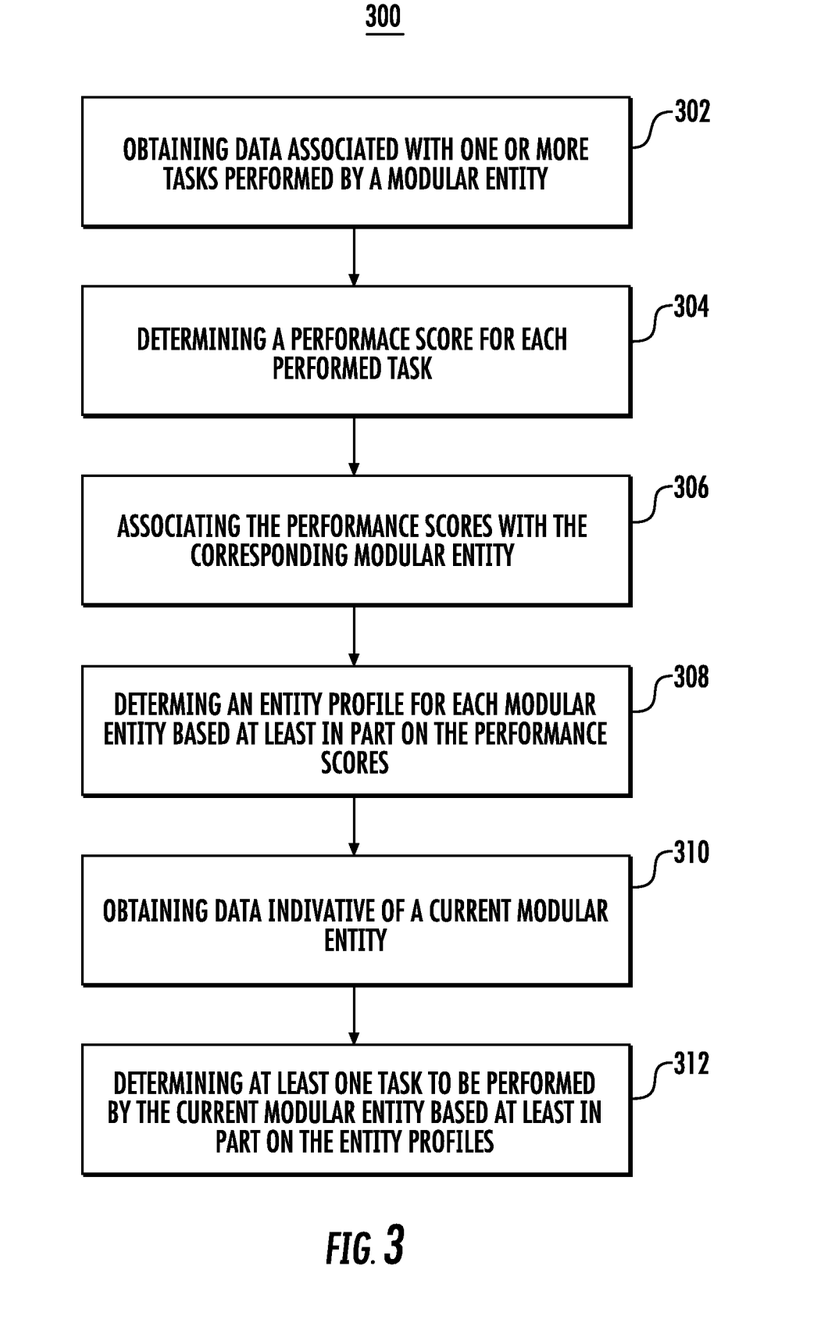
FIG. 3 depicts a flow diagram of an example method of determining tasks to be performed by a modular entity according to example embodiments of the present disclosure.

FIG. 3 depicts a flow diagram of an example method (300) of determining tasks to be performed by a modular entity according to example embodiments of the present disclosure. Method (300) can be implemented by one or more computing devices, such as one or more of the computing devices depicted in FIG. 4. In particular implementations, the method (300) can be implemented by the scorer 202, profiler 204, and/or task allocator 206 depicted in FIG. 2. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include obtaining data associated with one or more tasks performed by a plurality of modular entities. As indicated, a modular entity can include a computing device or component, a modular combination of components or devices, an ad hoc combination of components or devices, and/or various other suitable modular entities. Each modular entity can perform one or more computing tasks or subtasks. For instance, one or more components or devices that contribute to a modular entity may perform one or more tasks or subtasks. A task or subtask may be any suitable computing task using available resources of the entity, component and/or device. For instance, the task may be associated with one or more processing functions, memory functions, storage functions, and/or other suitable computing function.

At (304), method (300) can include determining a performance score for each performed task. As indicated, a performance score can be indicative of an efficiency with which a task is performed. In some implementations, a performance score can be a number in a desired scale. The performance scores can be determined based at least in part on a speed with which a task is performed, an amount of resources used in performing a task, an amount of errors produced in performing a task, etc.

At (306), method (300) can include associating the determined performance scores with the corresponding modular entities. For instance, the performance score determined for a task can be associated with the modular entity that performed the task. In implementations wherein a modular entity includes multiple components or devices, the performance scores can further be associated with the components or devices that performed the task. For instance, if a task is performed by a subset of devices of a modular entity, the corresponding performance score can be associated with the modular entity and the subset.

At (308), method (300) can include determining an entity profile for each modular entity based at least in part on the associated performance scores. The entity profile can include identifying information associated with the modular entity, such as identifying information associated with the components or devices that contribute to the modular entity. The entity profile can further include an indication of tasks that the modular entity is well suited for. Determining such tasks can include comparing the associated performance scores to a threshold. In this manner, modular entities having an associated performance score for a task that is greater than the threshold can be determined to be well suited to perform the task. In some implementations, the determination of which tasks that the modular entity is well suited for can be made based at least in part on one or more additional modular entities. For instance, if a comparable modular entity to the modular entity is well suited for a particular task, it may be determined that the modular entity is also well suited for the task. In some implementations, machine learning techniques can be used to determine tasks that a modular entity is well suited for. For instance, a machine learning model can be configured to receive data indicative of a modular entity as an input, and to provide a prediction of one or more tasks that the modular entity is well suited for. As another example, a machine learning model can be configured to receive data indicative of a modular entity and data indicative of a particular task as inputs, and to estimate a performance score as output. As indicated, the machine learning model can be trained using a set of training data that specifies performance scores for a plurality of modular entities in performing a plurality of tasks.

At (310), method (300) can include obtaining data associated with a requesting modular entity. For instance, the requesting modular entity can request information associated with performing one or more tasks. Such requests can include requests for a suggested task to perform, a performance score (e.g. a predicted performance score or an actual previously determined performance score) for performing the tasks, task allocation, task scheduling, additional services, and/or various other suitable request. The data associated with the requesting modular entity can further include data indicative of the components or devices that contribute to the requesting modular entity, available resources of the requesting modular entity, capabilities of the requesting modular entity, currently scheduled tasks, and/or other suitable information associated with the requesting modular entity.

At (312), method (300) can include determining one or more tasks for the requesting modular entity. For instance, the one or more tasks can be determined based at least in part on the determined entity profiles and the data associated with the requesting modular entity. In particular, the one or more tasks may be determined based at least in part on the capabilities of the modular entity, the available resources of the modular entity, a currently schedule of task performance associated with the modular entity, and/or one or more entity profiles associated with the modular entity. For instance, one or more entity profiles associated with the requesting modular entity can be accessed to determine tasks that the modular entity is currently well suited to perform. The associated entity profiles may include an entity profile previously created for the requesting modular entity and/or one or more comparable entity profiles created for comparable entity profiles. As indicated, a comparable entity profile can be an entity profile created for a modular entity having shared components or component types with the requesting modular entity. In this manner, a comparable entity profile can be an entity profile for a modular entity that may be well suited to perform similar tasks as the requesting modular entity. In some implementations, tasks determined for the requesting modular entity can be determined using machine learning techniques. For instance, data indicative of the requesting modular entity can be provided as input to a machine learning model configured to predict tasks that are well suited for the input modular entity. In some implementations, determining one or more tasks for the requesting modular entity can include determining a task and/or subtask allocation, a task schedule, an order in which tasks are to be performed, a manner in which tasks are to be performed, a suggested network or modular combination, a proposal for provision of additional services, a performance score listing, and/or various other suitable information associated with tasks to be performed by the requesting modular entity.

Figure 4:
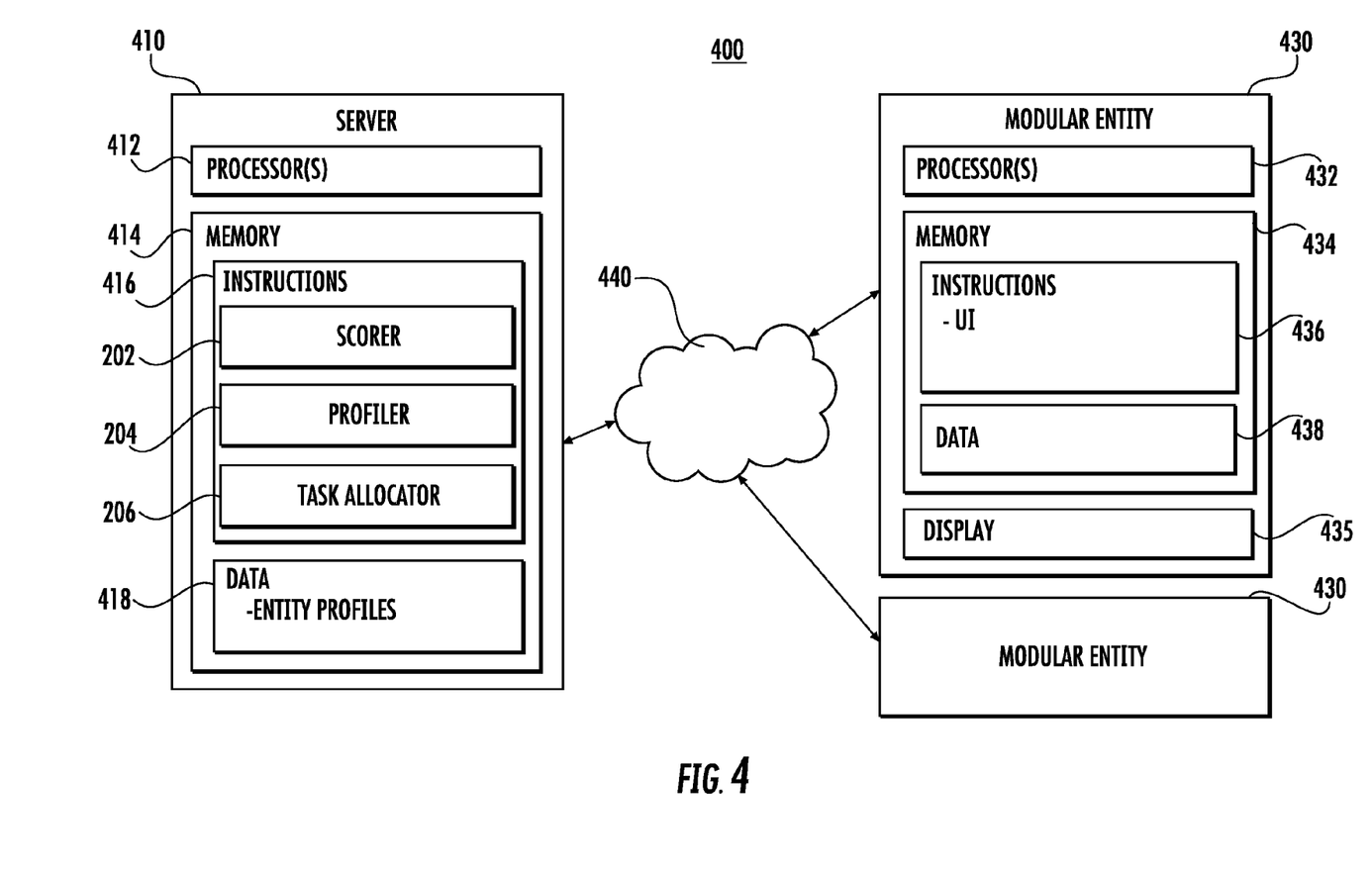
FIG. 4 depicts an example system according to example embodiments of the present disclosure.

FIG. 4 depicts an example computing system 400 that can be used to implement the methods and systems according to example aspects of the present disclosure. The system 400 can be implemented using a client-server architecture that includes a server 410 that communicates with one or more modular entities 430 over a network 440. The system 400 can be implemented using other suitable architectures, such as a single computing device.

The system 400 includes a server 410, such as a web server. The server 410 can be implemented using any suitable computing device(s). The server 410 can have one or more processors 412 and one or more memory devices 414. The server 410 can also include a network interface used to communicate with one or more modular entities 430 over the network 440. The network interface can include any suitable components for interfacing with one more networks, including for example, transmitters, receivers, ports, controllers, antennas, or other suitable components.

The one or more processors 412 can include any suitable processing device, such as a microprocessor, microcontroller, integrated circuit, logic device, or other suitable processing device. The one or more memory devices 414 can include one or more computer-readable media, including, but not limited to, non-transitory computer-readable media, RAM, ROM, hard drives, flash drives, or other memory devices. The one or more memory devices 414 can store information accessible by the one or more processors 412, including computer-readable instructions 416 that can be executed by the one or more processors 412. The instructions 416 can be any set of instructions that when executed by the one or more processors 412, cause the one or more processors 412 to perform operations. For instance, the instructions 416 can be executed by the one or more processors 412 to implement a scorer 202, a profiler 204, and a task allocator 206 described with reference to FIG. 2.

As shown in FIG. 4, the one or more memory devices 414 can also store data 418 that can be retrieved, manipulated, created, or stored by the one or more processors 412. The data 418 can include, for instance, entity profile data, modular entity data, and other data. The data 418 can be stored in one or more databases. The one or more databases can be connected to the server 410 by a high bandwidth LAN or WAN, or can also be connected to server 410 through network 440. The one or more databases can be split up so that they are located in multiple locales.

The server 410 can exchange data with one or more modular entities 430 over the network 440. Although two modular entities 430 are illustrated in FIG. 8, any number of modular entities 430 can be connected to the server 410 over the network 440. Each modular entity 430 can be a component, a computing device or a combination of components and/or computing devices. In some implementations, the combination of components and/or computing devices can be a modular combination and/or a combination formed through communication over an ad hoc network. The modular entities 430 can be configured to perform a plurality of computing tasks. In some implementations, a modular entity 430 can be configured to share resources among the devices within the modular entity to perform a plurality of computing tasks. In some implementations, a modular entity 430 may include one or more modular components that contribute functionality to the modular entity 430. Further, the modules depicted in FIG. 4 may be implemented by modular entity 430 in a modular manner, or via an ad hoc network.

Similar to the server 410, a modular entity 430 can include one or more processor(s) 432 and/or a memory 434. As indicated, modular entity 430 can include a combination of components that perform one or more functions, as contribution to the modular entity 430. For instance, a component may provide one or more functions, such as one or more processing functions and/or one or more memory-based functions. In this manner a modular entity may include any number of the modules depicted in FIG. 4. The one or more processor(s) 432 can include one or more central processing units (CPUs), graphics processing units (GPUs) dedicated to efficiently rendering images or performing other specialized calculations, and/or other processing devices. The memory 434 can include one or more computer-readable media and can store information accessible by the one or more processors 432, including instructions 436 that can be executed by the one or more processors 432 and data 438. For instance, the memory 434 can store instructions 436 for implementing a user interface module determined according to example aspects of the present disclosure.

The modular entity 430 of FIG. 8 can include various input/output devices for providing and receiving information from a user, such as a touch screen, touch pad, data entry keys, speakers, and/or a microphone suitable for voice recognition. For instance, the modular entity 430 can have a display device 435 for presenting a user interface according to example aspects of the present disclosure.

The modular entity 430 can also include a network interface used to communicate with one or more remote computing devices (e.g. server 410) over the network 440. The network interface can include any suitable components for interfacing with one more networks, including for example, transmitters, receivers, ports, controllers, antennas, or other suitable components.

The network 440 can be any type of communications network, such as a local area network (e.g. intranet), wide area network (e.g. Internet), cellular network, or some combination thereof. The network 440 can also include a direct connection between a modular entity 430 and the server 410. In general, communication between the server 410 and a modular entity 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining tasks to be performed by a modular entity, the method comprising:
   obtaining, by one or more computing devices, data associated with one or more tasks performed by one or more first modular entities within one or more modular computing environments, each first modular entity comprising at least one modular component;
   determining, by the one or more computing devices, a performance score for each task performed by each first modular entity, each performance score providing a measure of efficiency of a performance of a task by a first modular entity;
   determining, by the one or more computing devices, an entity profile for each first modular entity based at least in part on the determined performance scores;
   determining, by the one or more computing devices, at least one task to be performed by at least one modular entity based at least in part on the determined entity profiles for the one or more first modular entities;
   identifying, by the one or more computing devices, a plurality of candidate tasks associated with a second modular entity; and
   wherein determining, by the one or more computing devices, at least one task to be performed by at least one modular entity comprises determining at least one task to be performed by the second modular entity from the plurality of candidate tasks based at least in part on determined entity profiles for the one or more first modular entities, and wherein determining, by the one or more computing devices, at least one task to be performed by the second modular entity comprises identifying, by the one or more computing devices, at least one comparable entity profile to the second modular entity and determining, by the one or more computing devices, at least one task to be performed by the second modular entity based at least in part on the comparable entity profile, wherein the comparable entity profile to the second modular entity is an entity profile for a modular entity having at least one shared modular component or modular component type with the second modular entity.

2. The computer-implemented method of claim 1, wherein determining, by the one or more computing devices, an entity profile for each first modular entity comprises:
comparing, by the one or more computing devices, the performance scores for each first modular entity to a performance threshold; and
classifying, by the one or more computing devices, at least one modular entity as a specialist for one or more tasks based at least in part on the comparison.

3. The computer-implemented method of claim 1, wherein determining, by the one or more computing devices, a performance score for each task performed by each first modular entity comprises determining a performance score for each task performed by each computing device within each first modular entity.

4. The method of claim 1, further comprising receiving, by the one or more computing devices, data indicative of a request to perform a task by the second modular entity; and
wherein determining, by the one or more computing devices, at least one task to be performed by the second modular entity comprises determining whether to perform the requested task based at least in part on the determined entity profiles.

5. The computer-implemented method of claim 1, wherein the one or more modular entities comprise a modular component or a modular combination of devices.

6. The computer-implemented method of claim 5, wherein the modular combination of devices comprises a plurality of computing devices or components connected via an ad hoc network.

7. The computer-implemented method of claim 1, wherein determining, by the one or more computing devices, at least one task to be performed by the second modular entity comprises allocating one or more subtasks to at least one computing device within the second modular entity.

8. The computer-implemented method of claim 1, wherein determining, by the one or more computing devices, at least one task to be performed by the second modular entity comprises determining at least one task to be performed by the second modular entity based at least in part on one or more available resources of the second modular entity.

9. The computer-implemented method of claim 1, wherein the performance scores are determined based at least in part on a performance speed, an amount of resources used, or an amount of errors produced in performing the task.

10. The computer-implemented method of claim 1, wherein determining, by the one or more computing devices, at least one task to be performed by at least one modular entity comprises determining at least one task to be performed by the first modular entity.

11. A computing system comprising:
one or more processors; and
one or more memory devices, the one or more memory devices storing computer-readable instructions that when executed by the one or more processors cause the one or more processors to perform operations, the operations comprising:
obtaining data associated with one or more tasks performed by one or more first modular entities within one or more modular computing environments, each first modular entity comprising at least one modular component;
determining a performance score for each task performed by each first modular entity, each performance score providing a measure of efficiency of a performance of a task by a first modular entity;
determining an entity profile for each first modular entity based at least in part on the determined performance scores;
determining at least one task to be performed by at least one modular entity based at least in part on the determined entity profiles for the one or more first modular entities; and
determining at least one task to be performed by a second modular entity, wherein determining at least one task to be performed by a second modular entity comprises identifying at least one comparable entity profile to the second modular entity and determining at least one task to be performed by the second modular entity based at least in part on the comparable entity profile, wherein the comparable entity profile to the second modular entity is an entity profile for a modular entity having at least one shared modular component or modular component type with the second modular entity.

12. The computing system of claim 11, wherein determining an entity profile for each first modular entity comprises:
comparing the performance scores for each first modular entity to a performance threshold; and
classifying at least one modular entity as a specialist for one or more tasks based at least in part on the comparison.

13. The computing system of claim 11, wherein determining a performance score for each task performed by each first modular entity comprises determining a performance score for each task performed by each computing device within each first modular entity.

14. One or more tangible, non-transitory computer-readable media storing computer-readable instructions that when executed by one or more processors cause the one or more processors to perform operations, the operations comprising:
obtaining data associated with one or more tasks performed by one or more first modular entities within one or more modular computing environments, each first modular entity comprising at least one modular component;
determining a performance score for each task performed by each first modular entity, each performance score providing a measure of efficiency of a performance of a task by a first modular entity;
determining an entity profile for each first modular entity based at least in part on the determined performance scores;
determining at least one task to be performed by at least one modular entity based at least in part on the determined entity profiles for the one or more first modular entities
determining at least one task to be performed by a second modular entity, wherein determining at least one task to be performed by a second modular entity comprises identifying at least one comparable entity profile to the second modular entity and determining at least one task to be performed by the second modular entity based at least in part on the comparable entity profile, wherein the comparable entity profile to the second modular entity is an entity profile for a modular entity having at least one shared modular component or modular component type with the second modular entity.

15. The one or more tangible, non-transitory computer-readable media of claim 14, wherein determining an entity profile for each first modular entity comprises:
   comparing the performance scores for each first modular entity to a performance threshold; and
   classifying at least one modular entity as a specialist for one or more tasks based at least in part on the comparison.

* * * * *